Dec. 29, 1953 G. O. ARVIDSON 2,664,123
WORK FEED DEVICE FOR WOODWORKING TOOLS
Filed March 25, 1950 2 Sheets-Sheet 1

Inventor
George O. Arvidson
By
McCanna and Morsbach
Attys.

Dec. 29, 1953
G. O. ARVIDSON
2,664,123
WORK FEED DEVICE FOR WOODWORKING TOOLS
Filed March 25, 1950
2 Sheets-Sheet 2
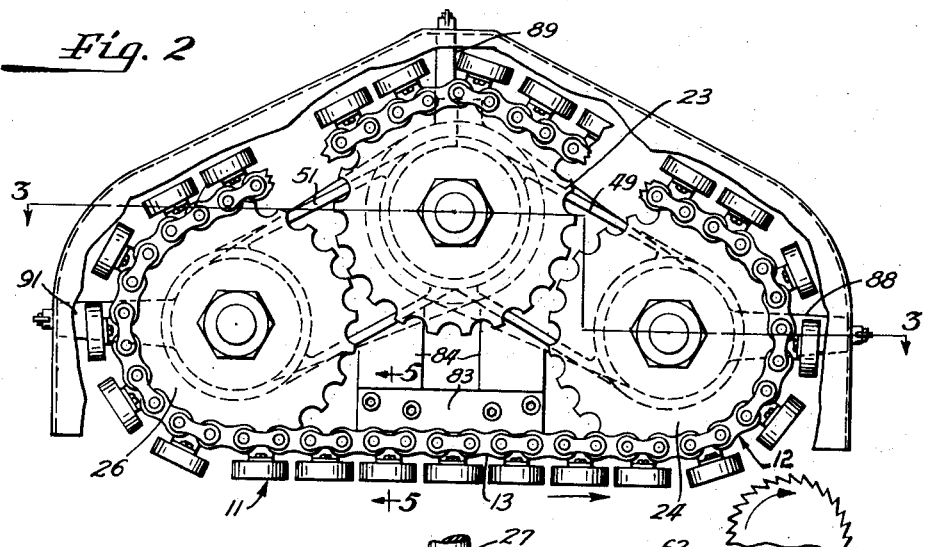
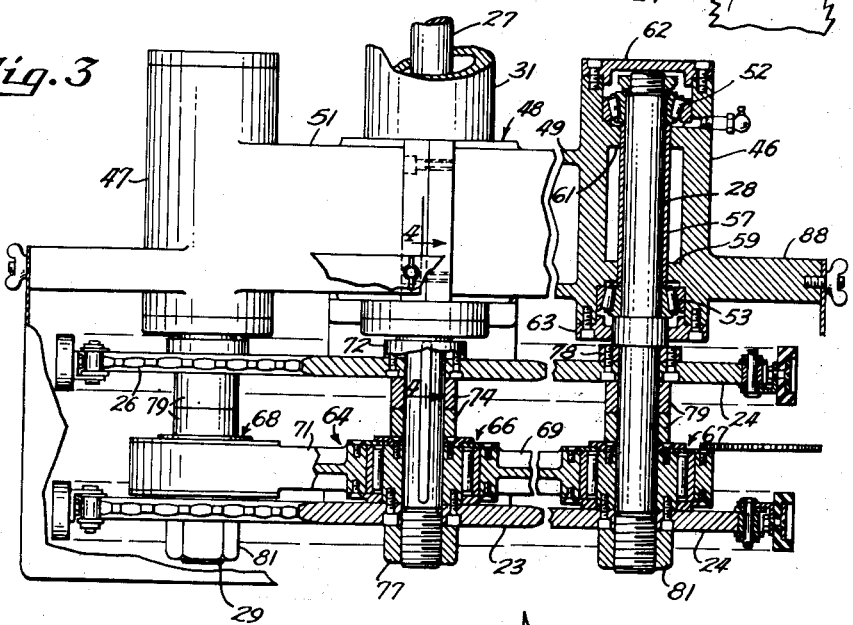
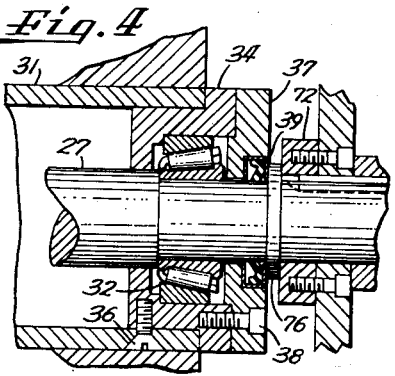
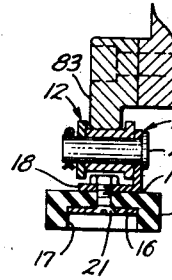
Inventor
George O. Arvidson
By
McCanna and Morsbach
Attys.

Patented Dec. 29, 1953

2,664,123

UNITED STATES PATENT OFFICE 2,664,123

WORK FEED DEVICE FOR WOODWORKING TOOLS

George O. Arvidson, Rockford, Ill.

Application March 25, 1950, Serial No. 151,977

5 Claims. (Cl. 144—242)

This invention relates to a feed mechanism and more particularly to a feed mechanism for feeding wooden panels having a finished surface, or other flat pieces of material, to circular saws, shapers, joiners, routers and the like.

In the furniture industry it is frequently necessary to cut panels to size after the latter have been sanded, or otherwise finished, for painting and varnishing. Present input feed mechanisms are not satisfactory for this purpose since the latter are provided with mechanisms that indent the surface of the paneling as they feed the panel to the saw. Such pieces of paneling have to be refinished which of course is an expense. In order to eliminate the formation of marks on panels, many operators prefer to feed the finished panels to the saw by hand rather than refinish the panel. Since many of the panels are of short length it is necessary that the operator gets his hands in close proximity to the saw blade in trimming the panels to the desired width. This is quite hazardous and many operators are injured in this process. Feeding panels to the trim saw is considered in general to be the most hazardous occupation in the furniture industry. Also in some cases the operator, in keeping his hands away from the saw, applies a lateral force to the panel that cants or tilts it as it is being pushed through the saw so that the paneling is not cut to dimensions and must be discarded.

An object of this invention is to provide a novel input feed mechanism for feeding finished panels and the like to a saw blade that frictionally engages the panel at a plurality of spaced aligned positions, that does not leave indentation marks or the like thereon, that applies a uniform feeding force to the panel on both sides of the saw blade as the panel is being fed to the saw so as to minimize canting or tilting of the panel and resultant binding of the paneling with the saw blade as it is fed thereto and that is satisfactory for feeding both relatively thin and thick pieces to the saw blade.

Another object is to provide an input feed mechanism of the above character that is simple, that requires a minimum of maintenance, that is positive in its feed action, that provides for protection of the operating personnel, that is adjustable to different speeds of operation, that is inexpensive, and that is compact.

Other objects and advantages of the invention will become apparent from the following detailed description taken in connection with the accompanying drawings, in which—

Fig. 2 is an end view of the housing for the friction members with portions of the housing cut away to show details of construction of the friction members and mounting means therefor;

Fig. 3 is a sectional view taken substantially along the line 3—3 of Fig. 2;

Fig. 4 is a sectional view taken substantially along the line 4—4 of Fig. 3, and Fig. 5 is a sectional view taken substantially along the line 5—5 of Fig. 2;

Figures 1, 6, 7:
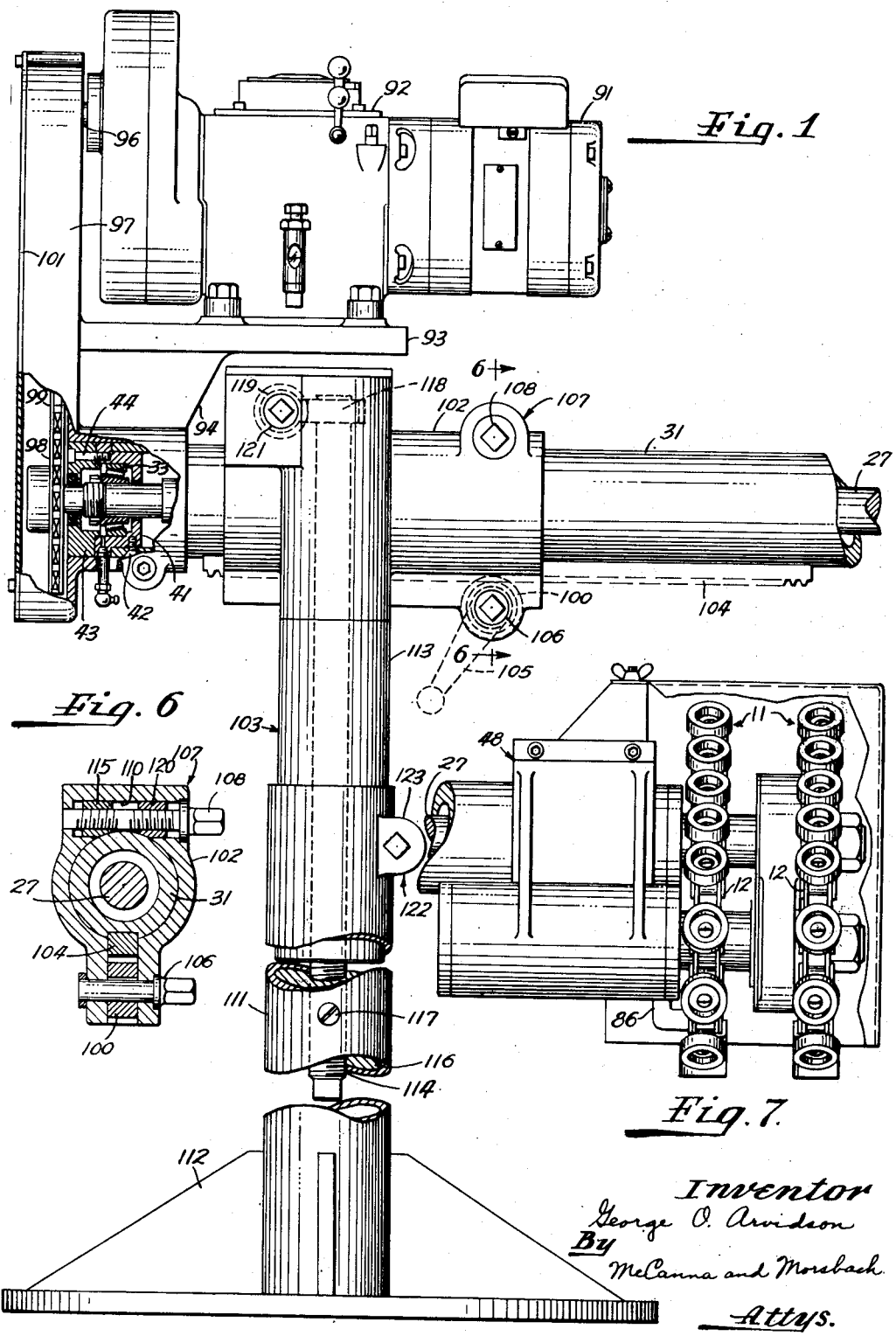
Figure 1 is a side elevational view of the support for the feed mechanism embodying the present invention with portions cut away to show the details of construction.
Fig. 6 is a sectional view taken along the line 6—6 of Fig. 1.
Fig. 7 is a side elevation view of the feed mechanism of the present invention which is associated with the support structure of Fig. 1.

Referring now to the drawings, the invention is shown embodied in a feed mechanism for feeding panels, having a finished surface, or a similar flat workpiece across a table (not shown) in a substantially straight path to a circular saw, a shaper, a joiner, a router, or the like (not shown). In general, the feed mechanism includes a plurality of spaced aligned friction members adapted to overlie the table on each side of the saw blade so as to be engageable with the top surface of the panel and means for progressively advancing the friction members past the saw blade to feed the panel thereto.

The friction members 11 are formed by friction cups mounted on the outwardly facing side of flexible connectors or chains 12 of conventional construction mounted to have portions 13 move along substantially linear paths spaced above the table adjacent the saw blade while at the same time having the friction members 11 engageable with the panel. As best seen in Fig. 5 the friction members 11 are preferably in the form of cylindrical shaped members having a closed end 14. While the friction members may be formed of any suitable resilient material they are shown herein as being formed from relatively soft resilient rubber pivotally attached to the chains 12 so that the open end of the cups face outwardly from the chains 12, the closed end 14 of each cup being held between a washer 16 received in the cavity 17 of the friction cup 11 and a flange 18 of a bracket 19 as by a bolt 21. The brackets 19 are secured to the chains 12 as by having the rivets 22, holding the links of the chain together, extend through apertures in the brackets 19 to hold them in face to face relation with sides of the chains, it being understood that the flanges 18 are offset with respect to the brackets as shown so that the friction cups 11 are substantially centered with the chain as shown in Fig. 5.

The chains 12 are spaced apart as shown in Figure 1 so as to straddle the saw blade and each chain is supported by a drive sprocket 23 and two idler sprockets 24 and 26. The drive sprockets 23 and idler sprockets 24 and 26 are arranged in a generally triangular configuration as seen in Fig. 2 with the drive sprockets forming the apex of the configuration and the idler sprockets being disposed below and at the sides of the drive sprockets. The drive sprockets 23 are mounted on the end of a drive shaft 27 and the idler sprockets 24 and 26 are mounted on stub shafts 28 and 29 in parallel relation with the drive shaft 27. The drive shaft 27 extends through a tubular support arm 31 and is mounted on suitable bearings 32 and 33 retained at opposite ends of the tubular arm 31. The bearing 32 at shown in Fig. 4 is retained by a suitable bearing retainer 34, received in the outer end of the tubular arm 31 and secured therein by a screw 36, and an end cap 37 secured to the retainer 34 as by screws 38. A lubricant seal 39 acts between the end cap 37 and the shaft 27 to prevent leakage of lubricant. The bearing 33 (Fig. 1) at the opposite end of the tubular arm 31 is held in a bearing retainer 41, secured in the opposite end of the tubular arm as by a screw 42, and an end cap 43 secured to the bearing insert 41 as by screws 44.

The stub shafts 28 and 29 are mounted in sleeve-like housings 46 and 47 (Fig. 3) disposed below and at the sides of the tubular arm 31. A split collar 48 mounted on the tubular arm 31 as seen in Fig. 3 is provided with downwardly inclined brackets 49 and 51 for securing the housings 46 and 47 to the arm 31. The shaft 28 is mounted by spaced thrust bearings 52 and 53 suitably retained at opposite ends of the housing 46 in a conventional manner. A bushing 57 supported by ribs 59 and 61 at opposite ends of the housing 46 extends between the bearings 52 and 53. An end cap 62 closes one end of the housing while an end cap 63 having an aperture for the shaft closes the opposite end of the housing 46. The idler shaft 29 is mounted in the housing 47 in the same manner that the idler shaft 28 is mounted in the housing 46.

The outer ends of the stub shafts 28 and 29 and the drive shaft 27 are maintained in aligned relation by a suitable bearing support and spacer 64. The latter includes a roller bearing 66 on the drive shaft and roller bearings 67 and 68 on the idler shafts 28 and 29 arranged so that the inner race of each bearing is keyed to its respective shaft and the outer race of the bearings 67 and 68 are supported by arms 69 and 71 which are attached to a hub portion 70 supporting the outer race of the roller bearing 61 as best seen in Fig. 3. The inner drive sprocket 23, which is secured to a collar 72 on the shaft 27, is held in spaced relation with the outer drive sprocket 23, secured to the inner race of the roller bearing 66, by sleeve spacers 74. The sprockets 23 are held against axial movement by a spacer 76 (Fig. 4) acting between the collar 72 and the end cap 37 and a nut 77 threaded on the outer end of the shaft 27. The idler sprockets 24 are mounted on the stub shaft 28 in a similar manner with the inner sprocket 24 being bolted to a collar 78 and the outer sprocket 24 being secured to the inner race of the roller bearing 67. Spacers 79 maintain the sprockets in spaced relation. The sprockets are held against axial movement by the collar 54 and a nut 81 on the outer end of the shaft. The sprockets 26 are mounted on the idler shaft 29 in a manner similar to that described for mounting the sprockets 24 on the idler shaft 28 including the spacers 79 and nut 81 on the outer end of the shaft 29.

Provision is made for guiding the portions 13 of the chains between the sprockets 24 and 26 so that the friction members 11 follow along a substantially linear path and are engageable uniformly with the surface of the panel to be fed to the saw blade. To accomplish this, rigid guides 83 are shaped to engage the side of each chain away from the friction members 11 as shown in Fig. 2. The outer guide plate 83 is mounted on brackets 84 extending downwardly from the arms 49 and 51. The lower edge of the outer guide plate 83 is substantially flat and is shaped to pass between the links of the chain 12 as best seen in Fig. 5. The inner guide plate 83 is shaped to engage the inner chain 12 in a similar manner and is secured to the tubular housing 31 by suitable brackets 86 (see Figure 7).

The friction members 11 and chains 12 and the mounting therefor are enclosed in a suitable enclosure or housing 87 as shown in Fig. 2. The housing is supported by arms 88, 89 and 91 extending outwardly from the housing 46, the tubular arm 31 and the housing 47 as seen in Fig. 2. The enclosure is shaped so that it encases the chains 12 and mounting sprockets therefor and has an opening at the bottom permitting the friction members 11 on the portion of the chain 13 to extend below the bottom edge of the enclosure so as to be frictionally engageable with the panel. The housing forms a shield or guard that prevents accidental contact by an operator with the moving parts of the feed mechanism yet at the same time does not interfere with its operation.

To provide a compact counterbalanced unit the power means for driving the shaft 27 and in turn the friction members 11 is mounted on the end of the tubular arm opposite to that supporting the friction members 11 and mounting means therefor. Thus, as shown in Figure 1, the power means includes a motor 91, a speed reducing unit 92, the output speeds of which may be varied in a conventional manner. The motor 91 is supported on and projects outwardly from the speed reducing unit 92. The latter is mounted on a platform 93 overlying the arm 31 and secured thereto as by a bracket 94. The drive shaft 96 of the speed reducing unit 92 is provided with a sprocket, not shown, in a housing 97 and drivingly connected to a sprocket 98 on the drive shaft 27 by a chain 99. A removable cover 101 on the housing 97 permits access thereto for maintenance of the sprockets and chain.

Means is provided for adjusting the relative elevation and horizontal position of the friction members 11 for use with different saw tables and to accommodate different thicknesses and widths of panels. Thus, as shown in Figure 1, the arm 31 is supported by a sleeve 102 at the upper end of a vertical column 103. The sleeve 102 is formed with an axially extending recess for receiving a rack 104 secured to the underside of the arm 31 and a pinion 100 attached to a rotary pin 106 having a squared end for reception in a crank 105 for adjusting the arm 31 axially. A lock mechanism 107 for locking the sleeve 102 and the arm 31 in fixed relation is provided at the top of the sleeve 102 and includes an actuating member 108, see Fig. 6, extending through a horizontal passageway 110 and having right and left hand threaded portions and a squared end for reception in the crank 105. Mounted on the threaded portions of the actuating member in the passageway 110 are wedging members 115 and 120 arranged so that when the actuating member 108 is rotated in one direction the wedging members 115 and 120 engage opposite sides of the tubular member 31 to positively secure the latter in a desired adjusted position and when rotated in the opposite direction the wedging members are moved to a retracted position in which they are away from the tubular member so that the tubular member may be moved relative to the sleeve. The vertical column or post 103 comprises a lower tubular member or portion 111 having a base 112 and an upper tubular member or portion 113 telescopically received in the lower tubular portion 111. A vertical screw 114 has its lower end received in a nut assembly 116 secured in the lower tubular portion 111 as by a screw 117 and the upper end of the screw has a gear 118 mounted thereon shaped to mesh with a gear 119 mounted on an actuating member 121 having a squared outer end for reception in the crank 105. A suitable lock mechanism 122, such as described for the lock mechanism 107, is provided for locking the upper and lower tubular portions in a desired adjusted position and including an actuating member 123 having a squared outer end for reception in the crank 105.

In the normal operation of the feed mechanism the length of the vertical column 103 is adjusted with respect to the saw table so that the friction members supported by the portions 13 of the chains 12 frictionally engage the panel to be sawed and the arm 31 is adjusted so that a chain 12 is on each side of the saw blades. When the drive sprockets 23 are rotated the chains 12 are caused to pass around the idler sprockets 24 and 26 and effect movement of the friction members 11 on the portions 13 of the chains progressively past the saw blade. The guides 33 form a backing for the chains 12 and assure that the friction members are urged into frictional engagement with the panel. As a result of the frictional engagement between the friction members and the panel the latter is caused to be fed to the blade at the same rate of movement as the friction members move past the saw blade.

Due to the fact that there is a relatively large number of aligned friction members engaging the panel on both sides of the saw blade sufficient force is available for feeding relatively thick pieces or heavy pieces of paneling to the saw blade. This feed mechanism is so constructed that a uniform pressure is applied to the panel on both sides of the saw blade. The cups are so arranged and shaped that while they frictionally engage the panel they do not indent the surface of the panel or otherwise mar the surface thereof. The enclosure 87 provides a guard for the operator and prevents accidental contact by him with the feed mechanism. One advantage of this feed mechanism is that the friction members can be caused to move into feeding engagement with the panel at a substantial distance from the saw blade so that the operator's hands are out of danger of contact with the saw blade at all stages of the panel feeding operation. This feed mechanism is simple, can be readily adjusted to accommodate different sizes and thicknesses of material. This construction may be made as a permanent attachment for a saw or may be made as a portable unit as disclosed herein so that it can be used with any of a plurality of saws. The mounting of the motor 91 and speed reducing unit 92 at one end of the arm for mounting the friction members at the opposite end of the arm provides a counterbalanced construction.

I claim:

1. In a saw feed mechanism for feeding a panel across a table to a saw blade, the combination of a vertical column, means for adjusting the length of said column, a horizontal tubular arm, means for mounting said arm on said column to have an end of the arm on each side of the column, means for moving said arm bodily transversely of the column, a shaft extending through said arm, spaced drive sprockets mounted on one end of said shaft, stub shafts spaced below and at opposite sides of said drive sprockets, bearing members attached to said arm for supporting said stub shafts, spaced idler sprockets mounted on said stub shafts, spaced endless chains supported by said drive and idler sprockets, friction members attached to said endless chains, guide means between said idler sprockets for guiding said friction members along a preselected path into engagement with the panel, a motor mounted on the opposite end of said arm, a speed reduction unit driven by said motor and means for connecting said speed reduction unit with the opposite end of the shaft to drive said endless chains to progressively advance the friction members on said panel past the saw blade to feed the panel thereto.

2. In combination, a friction feed mechanism, a horizontally extending support member, means for mounting said friction feed mechanism on one end of said support member, a motor, a speed reduction unit, means for rigidly mounting said motor and speed reduction unit on the opposite end of said support member to extend from said opposite end of said support member towards the first-mentioned end thereof and to overlie said member and be spaced thereabove, driving means for interconnecting the speed reduction unit and the friction drive mechanism, a sleeve for slidably receiving said horizontal support member, said support member being movable in said sleeve to a position in which said motor and speed reduction unit overlie said sleeve in vertical spaced relation thereto, means acting between said sleeve and horizontal member for moving the latter bodily horizontally to move said feed mechanism to a preselected horizontal position, a vertical column comprising an upper member rigidly secured to said sleeve and a lower tubular member adapted to telescopically receive said upper member and means for adjusting the relative position of said upper member with said lower member to adjust the vertical position of said friction feed mechanism.

3. In combination, a friction feed mechanism, a horizontally extending support, means for mounting said friction feed mechanism on one end of said support, a mounting bracket secured to the other end of said support and including a mounting plate overlying said support member in spaced relation thereto and extending therefrom towards said first-mentioned end of said support member, a motor, a speed reduction unit driven by said motor, means for mounting said motor and speed reduction unit on the mounting plate on said bracket to overlie said horizontal support in spaced relation thereabove, driving means for interconnecting the speed reduction unit and the friction drive mechanism, a sleeve for slidably receiving said horizontal support, means acting between said sleeve and horizontal support for moving the latter bodily horizontally to move said feed mechanism to a preselected horizontal position, a vertical column for supporting said feed mechanism comprising an upper member and a lower tubular member adapted to telescopically receive said upper member, means securing said sleeve to said upper member with said mounting plate adapted to overlie the upper end of said upper member, and means for adjusting the relative position of said upper member with said lower member to adjust the vertical position of said friction feed mechanism.

4. In combination, a friction feed mechanism, a horizontally extending support, means for mounting said friction feed mechanism on one end of said support, a shaft extending through said support and connected to said feed mechanism, a motor drive unit, means for mounting said drive unit on the opposite end of said support to overlie said support, means for drivingly interconnecting the drive unit and the shaft, a housing for said last-mentioned means rigidly secured on the opposite end of said support, a sleeve for slidably receiving said horizontal support, manually operable means acting between said sleeve and support member for moving the latter bodily horizontally to move said feed mechanism to a preselected horizontal position, a vertical column for supporting said feed mechanism comprising an upper tubular member secured to said sleeve and a lower tubular member adapted to telescopically receive said upper member, and means mounted on said upper tubular member for adjusting the relative position of said upper tubular member with respect to the lower tubular member to vary the vertical position of said friction feed mechanism, said drive unit mounting means comprising a horizontally disposed mounting plate secured to said housing and extending therefrom in vertical spaced relation to said support member to overlie said sleeve and the upper end of said upper tubular member, said motor drive unit being mounted on the upper face of said mounting plate.

5. In a saw feed mechanism for feeding a panel across a table to a saw blade, the combination of a horizontal tubular arm, means for mounting said arm in vertical spaced relation to the saw table, a drive shaft extending through said arm, spaced drive sprockets mounted on one end of said drive shaft, stub shafts spaced below and on opposite sides of said drive sprockets, bearing members attached to said arm for supporting said stub shafts, spaced idler sprockets mounted on said stub shafts, spaced endless chains supported on said drive and idler sprockets, a shaft support member including bearings on said drive shaft and each of said stub shafts spaced from said tubular arm and said bearing members respectively, and arms securing said bearing on said drive shaft to each of said bearings on said stub shafts to maintain said bearings in fixed spaced relation, friction members attached to said endless chains, guide means between said idler sprockets for guiding said friction members along a preselected path into engagement with the panel, a motor mounted on the opposite end of said tubular arm, a speed reduction unit driven by said motor and means for connecting said speed reduction unit with the opposite end of the shaft to drive the endless chains to progressively advance the friction members on said panel past the saw blade to feed the panel thereto.

GEORGE O. ARVIDSON.

References Cited in the file of this patent

UNITED STATES PATENTS

| Number | Name | Date |
|---|---|---|
| 850,338 | Bolton | Apr. 16, 1907 |
| 1,529,806 | Oettel | Mar. 17, 1925 |
| 1,634,196 | Jones | June 28, 1927 |
| 1,756,296 | Madsen | Apr. 29, 1930 |
| 1,850,773 | Rueger | Mar. 22, 1932 |
| 1,957,621 | Styron | May 8, 1934 |
| 2,022,288 | Knapp | Nov. 26, 1935 |
| 2,266,847 | Calpha et al. | Dec. 23, 1941 |
| 2,332,888 | Bostwick et al. | Oct. 26, 1943 |
| 2,374,429 | Hayes et al. | Apr. 24, 1945 |
| 2,382,971 | Brocco et al. | Aug. 21, 1945 |
| 2,387,446 | Herz | Oct. 23, 1945 |
| 2,455,097 | Scianna | Nov. 30, 1948 |
| 2,471,014 | Trebert | May 24, 1949 |

FOREIGN PATENTS

| Number | Country | Date |
|---|---|---|
| 139,888 | Switzerland | July 16, 1930 |
| 421,506 | Great Britain | Dec. 21, 1934 |